United States Patent
Choi et al.

(10) Patent No.: US 9,838,093 B2
(45) Date of Patent: Dec. 5, 2017

(54) METHOD OF TRANSMITTING AND RECEIVING FRAME FOR UPLINK MULTI-USER MULTIPLE-INPUT AND MULTIPLE-OUTPUT (UL MU-MIMO) COMMUNICATION

(71) Applicant: Electronics and Telecommunications Research Institute, Daejeon (KR)

(72) Inventors: Jee Yon Choi, Daejeon (KR); Hyoung Jin Kwon, Daejeon (KR); Je Hun Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/453,419

(22) Filed: Aug. 6, 2014

(65) Prior Publication Data
US 2015/0043482 A1 Feb. 12, 2015

(30) Foreign Application Priority Data

Aug. 6, 2013 (KR) .................. 10-2013-0093199
Sep. 23, 2013 (KR) .................. 10-2013-0112733
Feb. 7, 2014 (KR) .................. 10-2014-0014068

(51) Int. Cl.
| | | |
|---|---|---|
| H04W 4/00 | (2009.01) | |
| H04B 7/0452 | (2017.01) | |
| H04B 7/0404 | (2017.01) | |
| H04L 1/16 | (2006.01) | |
| H04W 74/06 | (2009.01) | |
| H04W 72/04 | (2009.01) | |

(52) U.S. Cl.
CPC ......... *H04B 7/0452* (2013.01); *H04B 7/0404* (2013.01); *H04L 1/1614* (2013.01); *H04W 72/04* (2013.01); *H04W 74/06* (2013.01)

(58) Field of Classification Search
None
See application file for complete search history.

(56) References Cited

U.S. PATENT DOCUMENTS

| | | | |
|---|---|---|---|
| 2010/0220679 A1 | 9/2010 | Abraham et al. | |
| 2011/0090855 A1* | 4/2011 | Kim ................. | H04B 7/0452 370/329 |
| 2011/0170627 A1* | 7/2011 | Kwon ............... | H04L 25/0204 375/295 |
| 2012/0093009 A1* | 4/2012 | Wang ............... | H04W 16/14 370/252 |

(Continued)

FOREIGN PATENT DOCUMENTS

KR 10-1740698 B1 5/2017

*Primary Examiner* — Bob Phunkulh (57) ABSTRACT

Provided is a method of transmitting and receiving a frame for a multi-user multiple-input and multiple-output (MU-MIMO) communication in an access point (AP), the method including determining at least one transmission station (STA), transmitting, to the transmission STA, an uplink multi-user poll (UL MU poll) frame requesting a data frame, receiving the data frame from the at least one transmission STA simultaneously, and transmitting an acknowledgement (ACK) frame to the at least one transmission STA in response to the receiving.

21 Claims, 9 Drawing Sheets

(56) References Cited

U.S. PATENT DOCUMENTS

2014/0119288 A1* 5/2014 Zhu .................. H04W 74/0816
370/329
2014/0185473 A1* 7/2014 Wong ................ H04W 74/0808
370/252

* cited by examiner

| Frame Control | RA (UL MU Group) | STA 1 | STA 2 | ... | STA n | FCS |

METHOD OF TRANSMITTING AND RECEIVING FRAME FOR UPLINK MULTI-USER MULTIPLE-INPUT AND MULTIPLE-OUTPUT (UL MU-MIMO) COMMUNICATION

CROSS-REFERENCE TO RELATED APPLICATION

This application claims the priority benefit of Korean Patent Application No. 10-2013-0093199, filed on Aug. 6, 2013, Korean Patent Application No. 10-2013-0112733 filed on Sep. 23, 2013, and Korean Patent Application No. 10-2014-0014068 filed on Feb. 7, 2014 in the Korean Intellectual Property Office, the disclosures of which are incorporated herein by reference.

BACKGROUND

1. Field of the Invention

Embodiments of the present invention relate to a media access control (MAC) protocol of a wireless local area network (WLAN), and more particularly, to a configuration of a frame for use in frame transmission based on uplink multi-user multiple-input and multiple-output (MU-MIMO) technology.

2. Description of the Related Art

Recently, in wireless communication systems, a multiple-input and multiple-output (MIMO) technology for transmitting and receiving data using at least two antennas is being generalized. A wireless local area network (WLAN) also enables at least two transmission antennas to be used from the Institute of Electrical and Electronics Engineers (IEEE) 802.11n standard. The IEEE 802.11n standard allows for use of up to four antennas, and the IEEE 802.11ac standard allows for use of up to eight antennas. For example, in a case of using a great number of transmission antennas, data transmission may be performed based on transmit beamforming technology, thereby improving a performance of signal reception.

For efficient use of frequency resources, the IEEE 802.11ac for which standardization is in progress may include downlink multi-user multiple-input and multiple-output (MU-MIMO) technology enabling an access point (AP) to simultaneously transmit beamformed data frames to a plurality of stations (STAs). Also, research is being conducted into uplink (UL) MU-MIMO technology enabling transmission of data frames to the AP from the plurality of STAs and reception of the data frames at the AP through being separated for each stream, to be conducted simultaneously.

Figure 1A:
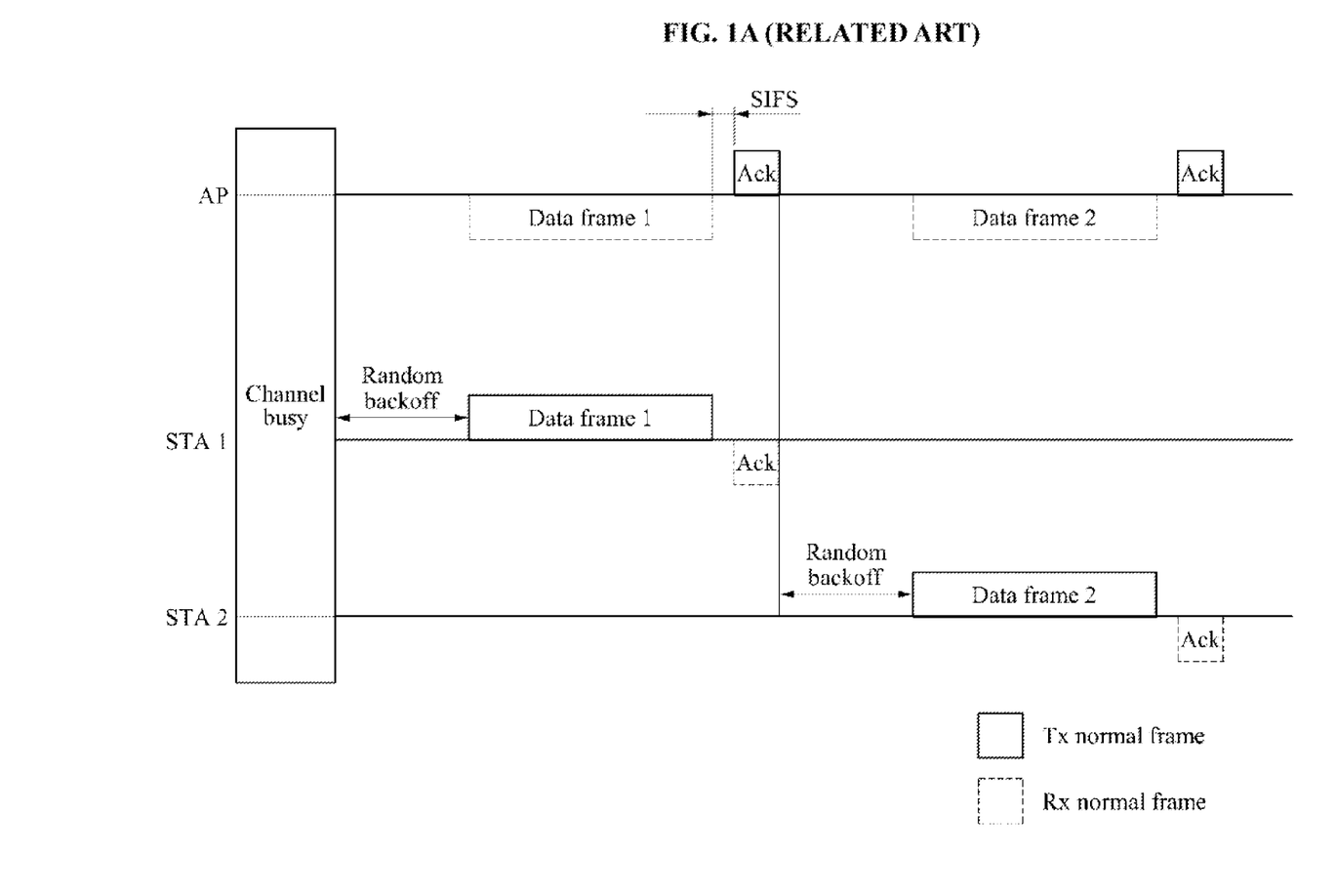
FIGS. 1A and 1B are diagrams illustrating examples of an operation in which at least two stations (STAs) transmit data to an access point (AP) according to a related art.

FIG. 1A illustrates an example of an operation in which at least two STAs transmit data to an AP according to a related art. An STA 1 and an STA 2 may initiate a random backoff when a channel is in an idle state. In FIG. 1A, the STA 1 terminating the random backoff earlier than the STA 2 may transmit a data frame 1 to the AP, and receive a first acknowledge (ACK) frame. Since the STA 2 listens to frames transmitted by the STA 1, the STA 2 may standby in a state of suspending the random backoff. When the ACK frame ends, the STA 2 may continue the random backoff, and transmit a data frame 2 to the AP.

Figure 1B:
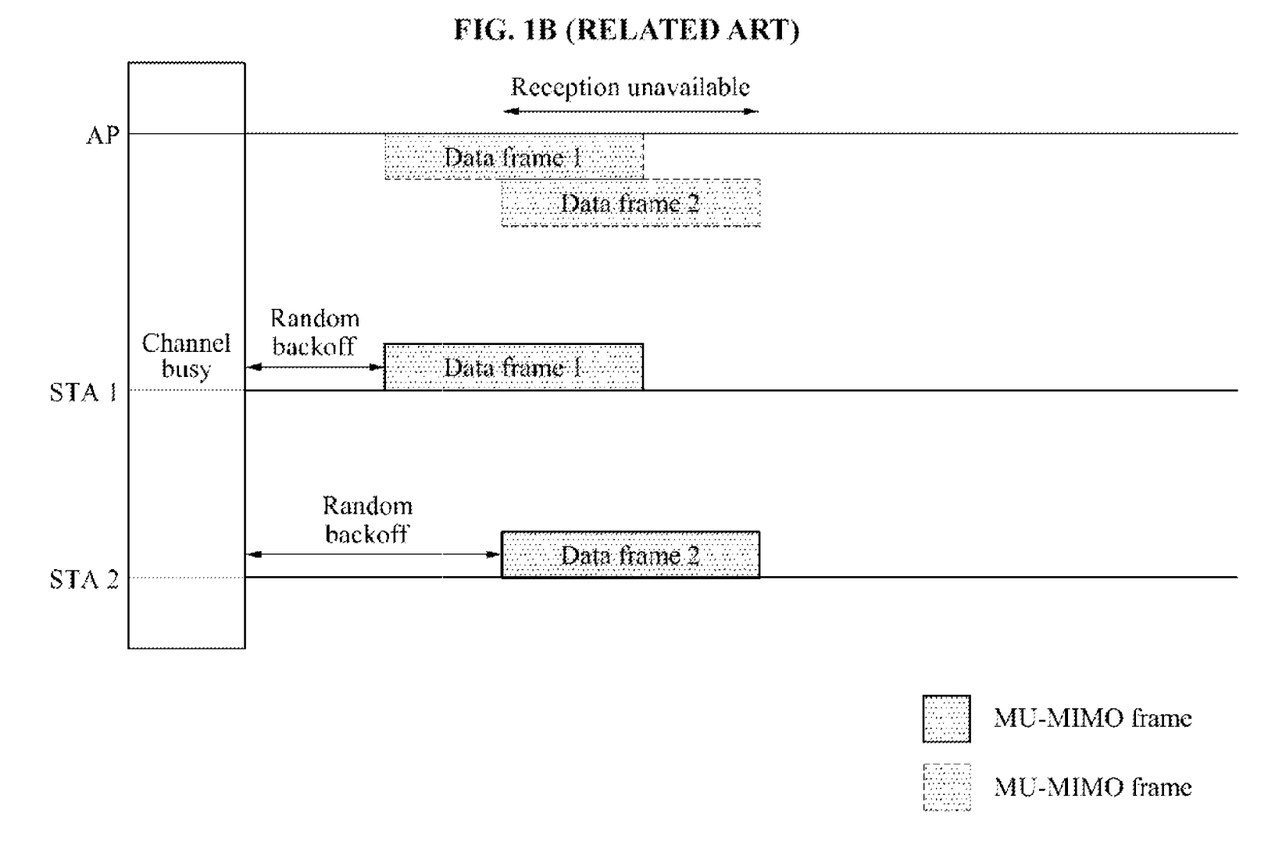

FIG. 1B illustrates an example of an operation in which at least two STAs transmit data to an AP based on UL MU-MIMO technology according to a related art.

Similar to the operation of FIG. 1A, an STA 1 and an STA 2 may initiate a random backoff when a channel is in an idle state. The STA 1 terminating the random backoff earlier than the STA 2 may transmit, to the AP, a data frame 1 on which beamforming is performed. Due to the beamforming, the STA 2 may not listen to the data frame 1. Thus, the STA 2 may process the random backoff without suspending transmission, and transmit a data frame 2 on which beamforming is performed to the AP.

When the data frame 2 is received during reception of the data frame 1, a physical (PHY) layer of the AP may abnormally perform data reception. Based on a known research result, UL MU-MIMO frames may need to be temporally synchronized within an error range of less than 100 nanoseconds (ns) to receive data.

Accordingly, UP MU-MIMO data reception may not be performed using an existing method.

SUMMARY

According to an aspect of the present invention, there is provided a method of transmitting and receiving a frame for a multi-user multiple-input and multiple-output (MU-MIMO) communication in an access point (AP), the method including determining at least one transmission station (STA), transmitting, to the transmission STA, an uplink multi-user poll (UL MU poll) frame requesting a data frame, receiving the data frame from the at least one transmission STA simultaneously, and transmitting an acknowledgement (ACK) frame to the at least one transmission STA in response to the receiving.

The UL MU poll frame may include identification information on the at least one transmission STA.

The identification information may include at least one of media access control (MAC) address information, association identification (AID) information, and partial AID information in an Institute of Electrical and Electronics Engineers (IEEE) 802.11ac.

The UL MU poll frame may include at least one of information on a transmission time and information on a number of transmission STAs.

The transmitting of the UL MU poll frame may include transmitting based on MU-MIMO technology or transmitting in an unbeamformed state.

The receiving may include receiving the data frame based on MU-MIMO technology.

The transmitting of the ACK frame may include transmitting a group ACK frame including at least one of identification information on the at least one transmission STA and a bitmap obtained by mapping the at least one transmission STA to a single bit.

The transmitting of the ACK frame may include transmitting the group ACK in an unbeamformed state.

The transmitting of the ACK frame may include transmitting at least one ACK frame including identification information on the at least one transmission STA.

The transmitting of the ACK frame may include transmitting the at least one ACK frame based on MU-MIMO technology.

According to another aspect of the present invention, there is also provided a method of transmitting and receiving a frame for an MU-MIMO communication in a transmission STA, the method including receiving, from an AP, a UL MU poll frame requesting a data frame, transmitting the data frame to the AP after a predetermined period of time elapses from a time at which the UL MU poll frame is received, and receiving an ACK frame responding to receiving of the data frame.

The UL MU poll frame may include identification information on the transmission STA.

The identification information may include at least one of MAC address information, AID information, and partial AID information in an IEEE 802.11 ac.

The UL MU poll frame may include at least one of information on a transmission time and information on a number of transmission STAs.

The receiving of the UL MU poll frame may include receiving based on MU-MIMO technology or receiving in an unbeamformed state.

The transmitting of the data frame may include transmitting the data frame based on the MU-MIMO technology.

The receiving of the ACK frame may include receiving a group ACK frame including at least one of a bitmap obtained by mapping the transmission STA to a single bit and identification information on the transmission STA.

The receiving of the ACK frame may include receiving the group ACK frame in an unbeamformed state.

The receiving of the ACK frame may include receiving the ACK frame including the identification information on the transmission STA.

The receiving of the ACK frame may include receiving the ACK frame based on the MU-MIMO technology.

According to still another aspect of the present invention, there is also provided an AP for use in an MU-MIMO communication, the AP including a controller to determine at least one transmission STA, and a communicator to transmit a UL MU poll frame to the at least one transmission STA, receive a data frame from the at least one transmission STA simultaneously, and transmit an ACK frame to the at least one transmission STA in response to receiving of the data frame.

According to yet another aspect of the present invention, there is also provided a transmission STA for use in an MU-MIMO communication, the STA including a communicator to receive, from an AP, a UL MU poll frame requesting a data frame, and a controller to control the communicator to transmit the data frame to the AP after a predetermined period of time elapses from a time at which the UL MU poll frame is received, wherein the communicator receives an ACK frame responding to receiving of the data frame.

The communicator may transmit the data frame based on MU-MIMO technology, receive a group ACK frame in an unbeamformed state, and receive the ACK frame including identification information on the transmission STA based on the MU-MIMO technology.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments will be described in detail with reference to the accompanying drawings. However, it should be understood that these embodiments are not construed as limited thereto. Like reference numerals in the drawings denote like elements.

The terms used in this specification were selected to include current, widely-used, general terms, in consideration of the functions of the present invention. However, the terms may represent different meanings according to the intentions of the skilled person in the art or according to customary usage, the appearance of new technology, etc.

In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

Figure 2:
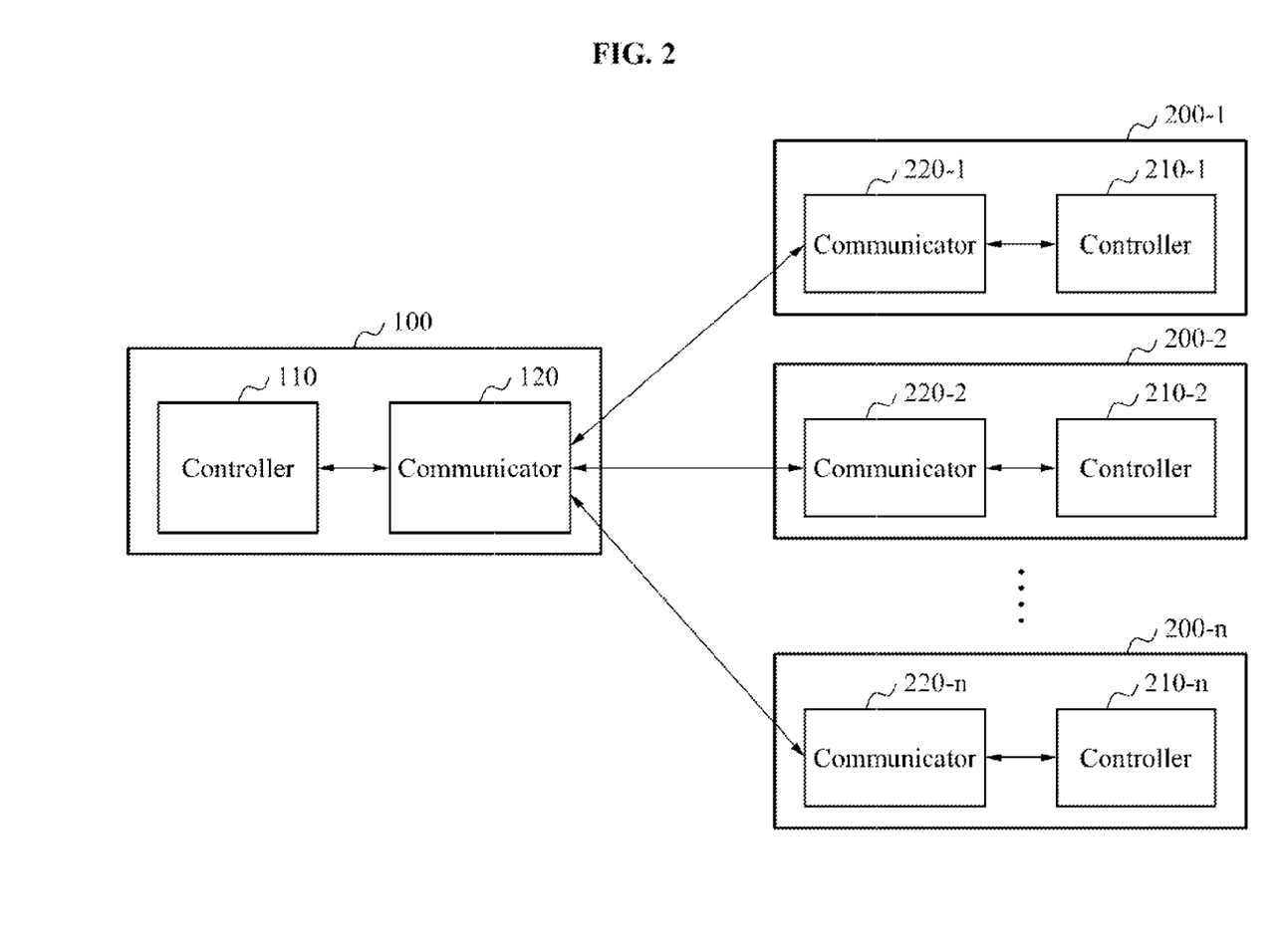
FIG. 2 is a block diagram illustrating an AP and STAs according to an example embodiment.

FIG. 2 is a block diagram illustrating an access point (AP) 100 and stations (STAs) 200-1 through 200-n according to an example embodiment.

Referring to FIG. 2, the AP 100 may include a controller 110 and a communicator 120.

The controller 110 may generate a frame transmitted by the communicator 120. The controller 110 may process a frame received by the communicator 120. The controller 110 may control the communicator 120 to communicate with at least one of communicators 220-1 through 220-n of the STAs 200-1 through 200-n based on a multiple-input and multiple-output (MIMO) scheme.

The controllers 210-1 through 210-n may process frames received by the communicators 220-1 to 220-n, or generate frames transmitted by the communicators 220-1 through 220-n. The controllers 210-1 through 210-n may control the communicators 220-1 through 220-n to transmit a data frame after a short interframe space (SIFS) from a time at which an uplink multi-user poll (UL MU poll) frame is received.

The controller 110 or each of the controllers 210-1 through 210-n may be implemented by, for example, an integrated circuit (IC) chip, a microprocessor, a minicomputer, and the like. The controller 110 or each of the controllers 210-1 through 210-n may determine, for example, an STA communicating with the communicator 120. The controller 110 or each of the controllers 210-1 through 210-n will be further explained with reference to the following descriptions.

The communicator 120 of the AP 100 may communicate with at least one of the communicators 220-1 through 220-n of the STAs 200-1 through 200-n. The communicator 120 of the AP 100 may transmit or receive the UL MU poll frame, the data frame, and an acknowledgement (ACK) frame to or from at least one of the communicators 220-1 through 220-*n* of the STAs 200-1 through 200-*n*. The communicator 120 may include a communication module such as an antenna, a modulator/demodulator, a frequency processing device, a filtering device, and the like.

Figure 3:
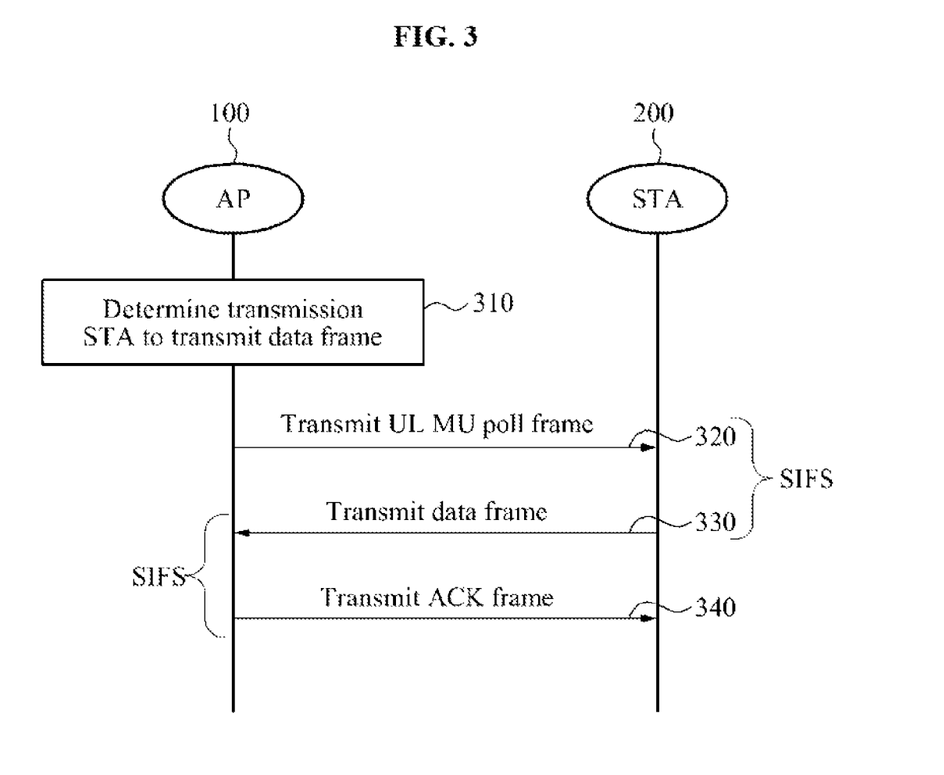
FIG. 3 is a timing diagram illustrating an example of operating an AP and an STA according to an example embodiment.

FIG. 3 is a timing diagram illustrating an example of operating an AP 100 and an STA 200 according to an example embodiment.

In operation 310, the AP 100 may determine a transmission STA to transmit a data frame. For example, the AP 100 may determine at least one of a plurality of STAs, for example, the STAs 200-1 through 200-*n* of FIG. 2, to be the transmission STA.

In operation 320, the AP 100 may transmit a UL MU poll frame to the STA 200. The UL MU poll frame may be a frame identifying a transmission STA and a frame instructing the transmission STA to transmit the data frame. The transmission STA may be preset to transmit the data frame after a predetermined period of time, for example, an SIFS, elapses in response to receiving the UL MU poll frame. As another example, the AP 100 may perform a request to send/clear to send (RTS/CTS) exchange before transmitting the UL MU request frame.

Figure 4:
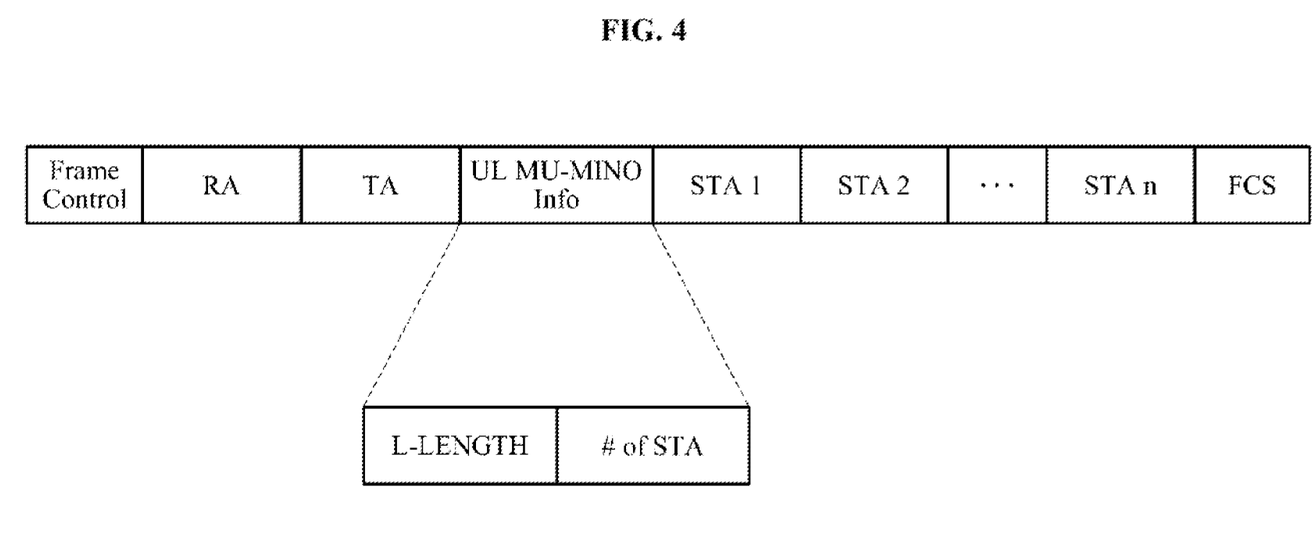
FIG. 4 is a diagram illustrating a configuration of an uplink multi-user poll (UL MU poll) frame according to an example embodiment.

A configuration of the UL MU poll frame according to an example embodiment may be indicated with reference to FIG. 4. Referring to FIG. 4, the UL MU poll frame may include a frame control field, a receiver address (RA) field, a transmitter address (TA) field, a UL MU-MIMO common information (UL MU-MIMO info) field, transmission STA information (STA info) fields, and a frame check sequence (FCS) field. As described above, the UL MU poll frame may include the transmission STA fields, and include identification information on transmission STAs corresponding to STA1 through STAn. In an embodiment, the identification information on each of the transmission STAs may include at least one of media access control (MAC) address information, association identification (AID) information, and partial AID information in the Institute of Electrical and Electronics Engineers (IEEE) 802.11 ac.

The UL MU poll frame may include UL MU-MIMO common information. The UL MU-MIMO common information may include a value of a transmission time information field, for example, an L-LENGTH, included in an L-SIG of a physical (PHY) layer overhead, and a number of STAs to simultaneously transmit data frames. Here, "being simultaneous" may be used to indicate a degree of identicalness in terms of a time, or being provided within a predetermined error range. The L-LENGTH may be used for a LENGTH value included in an L-SIG of a beamformed data frame to be transmitted by each of the STAs during a UL MU-MIMO transmission interval. In the present disclosure, a transmission time may refer to a period of time during which transmission is performed.

When a PHY protocol data unit (PPDU) type of the beamformed data frame is a high throughput (HT) PPDU or a very high throughput (VHT) PPDU, a LENGTH field of the L-SIG may be changed to a temporal length of a frame. Thus, when each of the STAs transmits the data frame, data of which an amount corresponds to the temporal length indicated in the L-LENGTH may be transmitted.

Referring back to FIG. 3, the STA 200 may receive a UL MU poll frame. The STA 200 may determine whether the STA 200 is the transmission STA by verifying identification information on the transmission STA in the UL MU poll frame.

In operation 330, when the STA 200 is the transmission STA, the STA 200 may transmit the data frame after the SIFS in response to receiving the UL MU poll frame. Other STAs may also receive UL MU poll frames and transmit data frames after the SIFS. Thus, all transmission STAs may simultaneously transmit data frames to the AP.

In operation 340, the AP 100 may transmit an ACK frame to the STA 200 corresponding to the transmission STA. The AP 100 may need to transmit the ACK frame to all transmission STAs. To this end, the AP 100 may use a group address indicating a predetermined UL MU-MIMO group to be a receiver address (RA). An ACK frame including the group address may be referred to as a group ACK frame.

Figure 5:
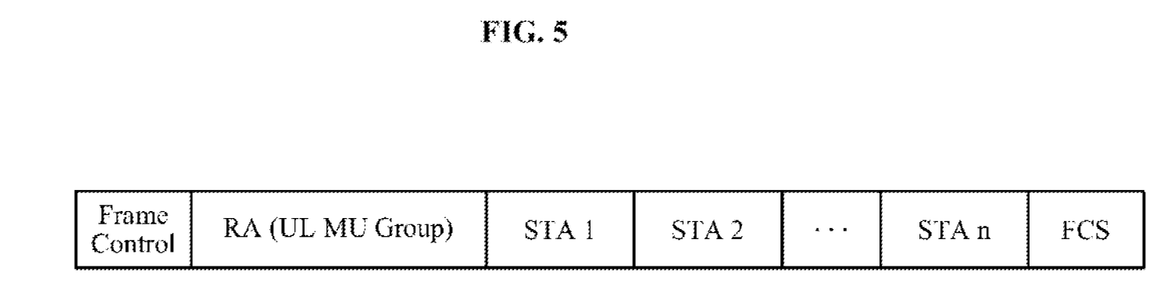
FIG. 5 is a diagram illustrating an example of a group acknowledgement (ACK) frame according to an example embodiment.
Figure 6:
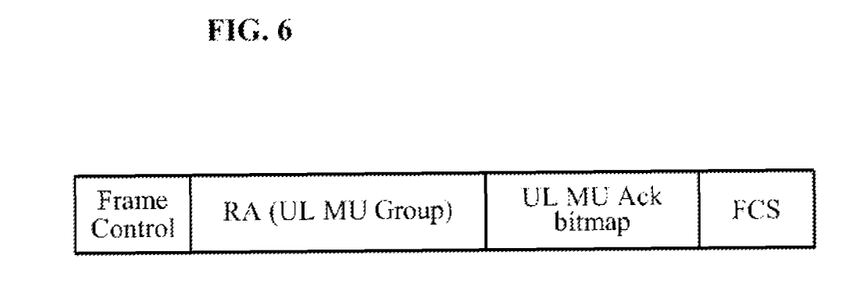
FIG. 6 is a diagram illustrating another example of a group ACK frame according to an example embodiment.

FIG. 5 is a diagram illustrating an example of a group ACK frame according to an example embodiment, and FIG. 6 is a diagram illustrating another example of the group ACK frame according to an example embodiment. Referring to FIG. 5, a group address, for example, a UL MU group, may be included in an RA field. In an embodiment, the group address may include identification information on a transmission STA successfully receiving a data frame, to provide notification on whether the data frame is received.

Referring to FIG. 6, a UL MU ACK bitmap may be included in a group ACK frame. The UL MU ACK bitmap may be a bitmap obtained by mapping a single bit to a single STA. The UL MU ACK bitmap may be formed based on a sequential order and a list of STAs included in a UL MU poll frame as a reference.

In an embodiment, at least one of the UL MU poll frame and the ACK frame may be transmitted based on a downlink MU-MIMO technology, or transmitted in an unbeamformed state.

Figure 7:
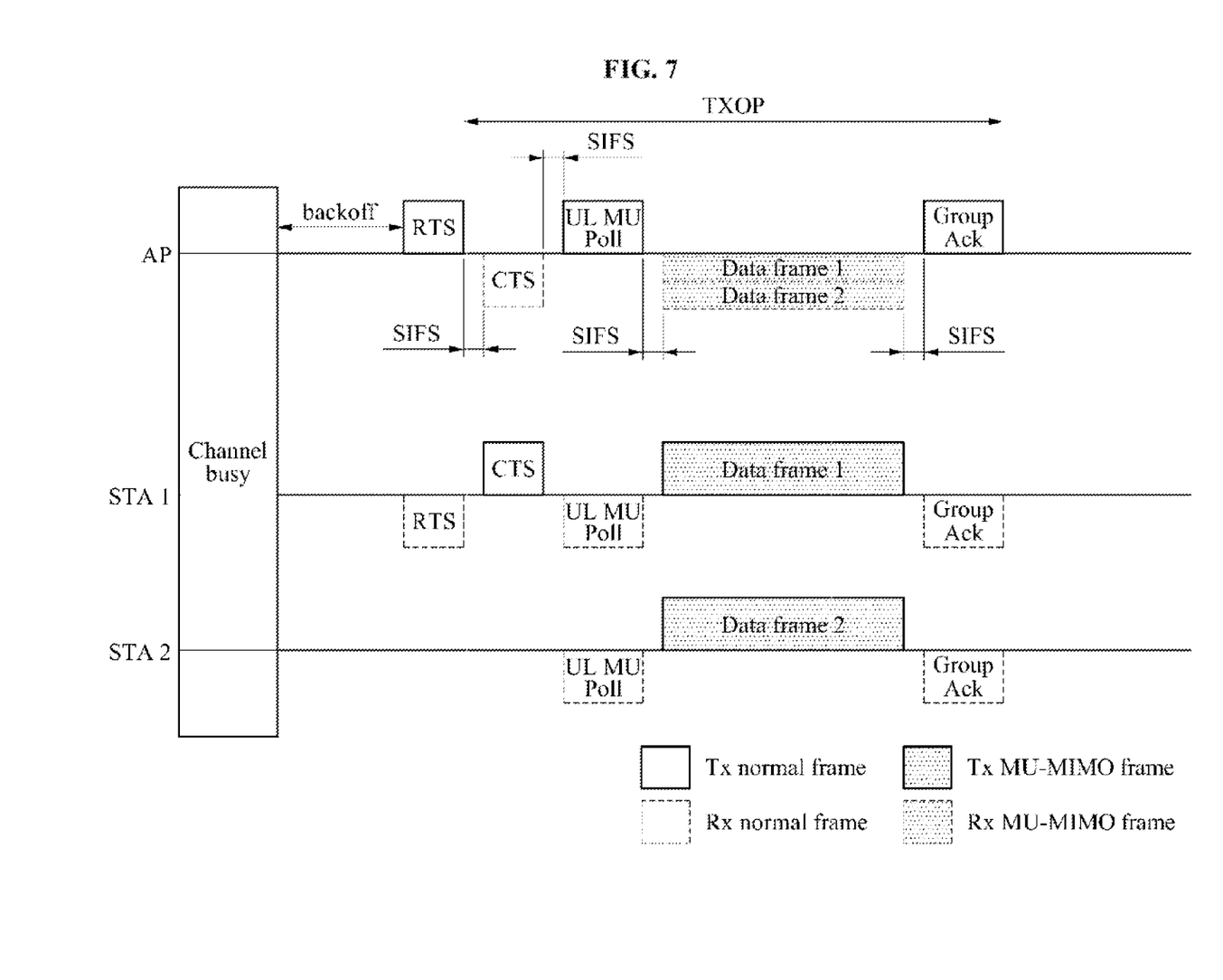
FIG. 7 is a diagram illustrating an example of an uplink multi-user multiple-input and multiple-output (MU-MIMO) data transmission protocol according to an example embodiment.
Figure 8:
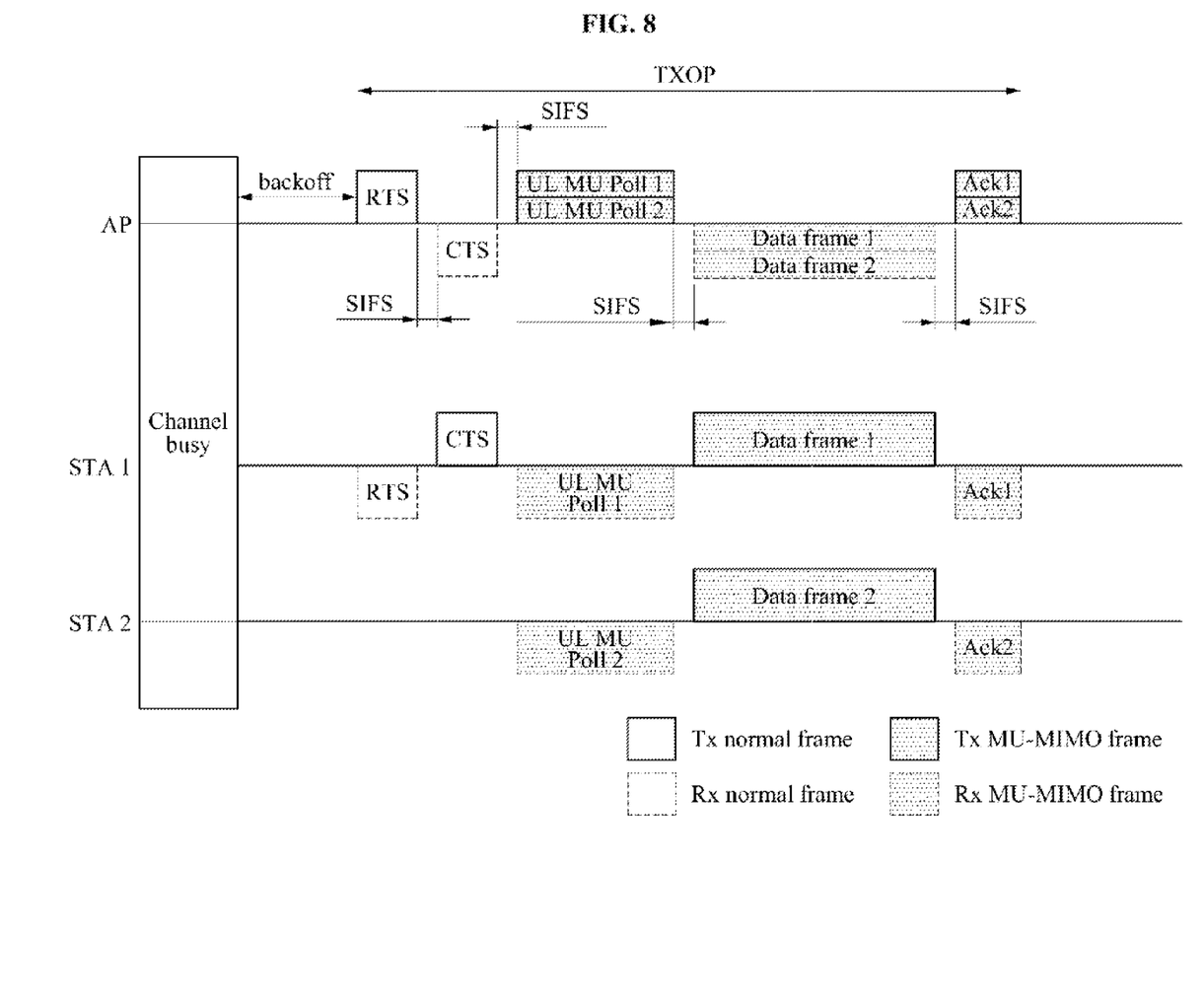
FIG. 8 is a diagram illustrating another example of a UL MU-MIMO data transmission protocol according to an example embodiment.

FIG. 7 is a diagram illustrating an example of a UL MU-MIMO data transmission protocol according to an example embodiment, and FIG. 8 is a diagram illustrating another example of the UL MU-MIMO data transmission protocol according to an example embodiment. For example, a data transmission protocol used when MU-MIMO technology is not applied to a UL MU poll frame and a group ACK frame may be indicated with reference to FIG. 7.

Referring to FIG. 7, for protection, an AP may perform an RTS/CTS exchange before transmitting a UL MU poll frame. For example, the AP may perform a backoff after a channel busy interval. When the backoff is performed, the AP may transmit RTS frames to STAs including an STA 1 and an STA 2. In response to receiving the RTS frames, the STAs may transmit CTS frames to the AP after an SIFS.

When the CTS frames are received, the AP may transmit the UL MU poll frame to transmission STAs including the STA 1 and the STA 2 after the SIFS. The UL MU poll frame may be transmitted in an unbeamformed state.

The transmission STAs may transmit data frames including a data frame 1 and a data frame 1 after the SIFS in response to receiving the UL MU poll frame. The data frames may be transmitted based on MU-MIMO technology.

The AP may receive the data frames, and then transmit a group ACK frame to each of the transmission STAs after the SIFS. The group ACK frame may be transmitted in an unbeamformed state.

A data transmission protocol used when a UL MU poll frame and a group ACK frame are transmitted based on downlink MU-MIMO technology may be indicated with reference to FIG. 8.

Referring to FIG. 8, for protection, an AP may perform an RTS/CTS exchange before transmitting a UL MU poll frame. For example, the AP may perform a backoff after a channel busy interval. When the backoff is performed, the AP may transmit RTS frames to STAs including an STA 1 and an STA 2. In response to receiving the RTS frames, the STAs may transmit CTS frames to the AP after an SIFS.

When the CTS frames are received, the AP may transmit the UL MU poll frame to transmission STAs including the STA 1 and the STA 2 after the SIFS. The UL MU poll frame may be transmitted based on MU-MIMO technology.

The transmission STAs may transmit data frames including a data frame 1 and a data frame 1 after the SIFS from a time at which the UL MU poll frame is received. The data frames may be transmitted based on the MU-MIMO technology.

The AP may receive the data frames, and then transmit ACK frames including an ACK1 and an ACK2 to the transmission STAs after the SIFS. The ACK frames may be transmitted based on the MU-MIMO technology. The ACK1 and the ACK2 may include STA1 identification information and STA2 identification information, respectively.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of transmitting and receiving a frame for a multi-user multiple-input and multiple-output (MU-MIMO) communication in an access point (AP), the method comprising:
   determining at least one transmission station (STA);
   transmitting, to the at least one transmission STA, by the AP, an uplink multi-user poll (UL MU poll) frame requesting an UL MU transmission, the UL MU poll frame comprising a common information field that includes a length field indicating a value of a length field of an L-SIG of a frame to be received by the AP;
   receiving, from the at least one transmission STA, the frame that is sent in response to the UL MU poll frame transmitted by the AP; and
   transmitting an acknowledgement (ACK) frame to the at least one transmission STA in response to the receiving.

2. The method of claim 1, wherein the UL MU poll frame further comprises identification information on the at least one transmission STA.

3. The method of claim 2, wherein the identification information comprises at least one of media access control (MAC) address information, association identification (AID) information, and partial AID information in an Institute of Electrical and Electronics Engineers (IEEE) 802.11ac.

4. The method of claim 1, wherein the UL MU poll frame further comprises at least one of information on a transmission time and information on a number of transmission STAs.

5. The method of claim 1, wherein the transmitting of the UL MU poll frame comprises transmitting based on MU-MIMO technology or transmitting in an unbeamformed state.

6. The method of claim 1, wherein the receiving comprises receiving the frame based on MU-MIMO technology.

7. The method of claim 1, wherein the transmitting of the ACK frame comprises transmitting a group ACK frame comprising at least one of identification information on the at least one transmission STA and a bitmap obtained by mapping the at least one transmission STA to a single bit.

8. The method of claim 7, wherein the transmitting of the ACK frame comprises transmitting the group ACK in an unbeamformed state.

9. The method of claim 1, wherein the transmitting of the ACK frame comprises transmitting at least one ACK frame comprising identification information on the at least one transmission STA.

10. The method of claim 9, wherein the transmitting of the ACK frame comprises transmitting the at least one ACK frame based on MU-MIMO technology.

11. A method of transmitting and receiving a frame for a multi-user multiple-input and multiple-output (MU-MIMO) communication in a transmission station (STA), the method comprising:
    receiving, from an access point (AP), an uplink multi-user poll (UL MU poll) frame requesting an UL MU transmission, the UL MU poll frame comprising a common information field that includes a length field indicating a value of a length field of an L-SIG of a frame;
    transmitting the frame to the AP in response to the UL MU poll frame; and
    receiving an acknowledgement (ACK) frame responding to receiving of the frame.

12. The method of claim 11, wherein the UL MU poll frame further comprises identification information on the transmission STA.

13. The method of claim 12, wherein the identification information comprises at least one of media access control (MAC) address information, association identification (AID) information, and partial AID information in an Institute of Electrical and Electronics Engineers (IEEE) 802.11ac.

14. The method of claim 11, wherein the UL MU poll frame further comprises at least one of information on a transmission time and information on a number of transmission STAs.

15. The method of claim 11, wherein the receiving of the UL MU poll frame comprises receiving based on MU-MIMO technology or receiving in an unbeamformed state.

16. An access point (AP) for use in a multi-user multiple-input and multiple-output (MU-MIMO) communication, the AP comprising:
    a controller to determine at least one transmission station (STA); and
    a communicator to:
        transmit, to the at least one transmission STA, an uplink multi-user poll (UL MU poll) frame requesting an UL MU transmission, the UL MU poll frame comprising a common information field that includes a length field indicating a value of a length field of an L-SIG of a frame to be received by the AP,
        receive, from the at least one transmission STA, the frame that is sent in response to the UL MU poll frame, and
        transmit an acknowledgement (ACK) frame to the at least one transmission STA in response to receiving of the frame.

17. The AP of claim 16, wherein the UL MU poll frame further comprises identification information on the at least one transmission STA.

18. The AP of claim 16, wherein the UL MU poll frame further comprises at least one of information on a transmission time and information on a number of transmission STAs.

19. A transmission station (STA) for use in a multi-user multiple-input and multiple-output (MU-MIMO) communication, the STA comprising:
    a communicator to receive, from an access point (AP), an uplink multi-user poll (UL MU poll) frame requesting an UL MU transmission, the UL MU poll frame comprising a common information field that includes a length field indicating a value of a length field of an L-SIG of a frame; and
    a controller to control the communicator to transmit, to the AP, the frame that is sent in response to the UL MU poll frame,
    wherein the communicator receives an acknowledgement (ACK) frame responding to receiving of the frame.

20. The STA of claim 19, wherein the communicator transmits the frame based on MU-MIMO technology, receives a group ACK frame in an unbeamformed state, and receives the ACK frame comprising identification information on the transmission STA based on the MU-MIMO technology.

21. The method of claim 1, wherein the frame from the at least one transmission STA has a value of a length field of an L-SIG that corresponds to the value of the length of the L-SIG provided by the UL-MU poll frame transmitted by the AP.

* * * * *